(12) United States Patent
Gildwel et al.

(10) Patent No.: US 12,417,340 B2
(45) Date of Patent: Sep. 16, 2025

(54) TEMPLATE DRIVEN ARCHITECTURE

(71) Applicant: Bank of America Corporation, Charlotte, NC (US)

(72) Inventors: Heath Gildwel, McKinney, TX (US); Martin Christian, Barnegat, NJ (US); Joseph Lias, Sanford, FL (US); Tanya Wilson, Newark, DE (US); Dennis B. Lowes, Rock Hill, SC (US); Venkata Chintalapati, Prosper, TX (US); Singaravelu Marakkanam, Frisco, TX (US); Adi Lakshmi Mudadla, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 397 days.

(21) Appl. No.: 18/158,158

(22) Filed: Jan. 23, 2023

(65) Prior Publication Data
US 2024/0249067 A1     Jul. 25, 2024

(51) Int. Cl.
*G06F 40/12* (2020.01)
*G06Q 10/087* (2023.01)

(52) U.S. Cl.
CPC .......... *G06F 40/12* (2020.01); *G06Q 10/087* (2013.01)

(58) Field of Classification Search
None
See application file for complete search history.

(56) References Cited

U.S. PATENT DOCUMENTS

| | | | |
|---|---|---|---|
| 9,851,968 B2 | 12/2017 | Straub | |
| 10,855,537 B2 | 12/2020 | Tembey et al. | |
| 2016/0092179 A1* | 3/2016 | Straub | G06F 8/71 717/107 |
| 2021/0349927 A1* | 11/2021 | Freundlich | H04N 1/4446 |

* cited by examiner

*Primary Examiner* — Yi Wang
(74) *Attorney, Agent, or Firm* — Banner & Witcoff, Ltd.

(57) ABSTRACT

Aspects of the disclosure relate to a template driven interface system having a parsing engine that may dynamically render web forms given a specification document. In some instances, the architecture may leverage the specification document and enable creation, management, and eventual decommissioning actions. The architecture may be framework-agnostic, allowing for adaptive and agile development of end user interfaces for services developed by different entities or product providers. The different entities may be external entities having control over their assets and related asset schemas. The architecture may allow for real-time updates as compared to scheduled release cycles.

20 Claims, 15 Drawing Sheets

TEMPLATE DRIVEN ARCHITECTURE

BACKGROUND

Aspects of the disclosure relate to electrical computers and digital processing systems, data transferring, and enhanced template processing systems for web page modification at front end client devices. In particular, one or more aspects of the disclosure relate to computing devices that leverage JSON schemas.

Many large enterprise organizations deploy user-facing portals to provide access to user resources. In many cases, these portals are deployed as a collection of authenticated web pages. It is desirable to quickly and efficiently perform dynamic validation for any changes to content on such pages. In large enterprises it may be difficult to make changes which are validated against their schema in a timely manner while also improving and optimizing the consumption of computing resources and network bandwidth for the enterprise server infrastructure that hosts such pages.

SUMMARY

Aspects of the disclosure provide effective, efficient, scalable, and convenient technical solutions that address and overcome the technical problems associated with front end user interface generation and maintenance. For example, some aspects of the disclosure provide techniques that may enable computing devices to generate real-time templates using logical document object models. Accordingly, client devices may overcome deficiencies associated with conventional techniques for updating web pages. In doing so, the client device may provide real-time implementation of updates and conserve network bandwidth and client side processing resources.

In one or more instances, a template driven interface system is provided having a parsing engine that may dynamically render web forms given a specification document. In some instances. the architecture may leverage the specification document and enable creation, management, and eventual decommissioning actions. The architecture may be framework-agnostic, allowing for adaptive and agile development of end user interfaces for services developed by different entities or product providers. The different entities may be external entities having control over their assets and related asset schemas. The architecture may allow for real-time template updates out of regular release cycles.

In accordance with one or more embodiments of the disclosure, a computing device comprising at least one processor, a communication interface, and memory storing computer-readable instructions may generate a product request. In some instances, the product request may include an SPK and a product identification. The computing device may determine a product provider for handling the product request, the determination of the product provider based in part on searching for the product provider based on the included SPK in the product request. The computing device may transmit a product schema request to the determined product provide. The computing device may receive from the determined product provider the requested product schema. The computing device may parse the product schema into a renderable format. The computing device may render an order form for submitting an order. The computing device may display an order form.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In one or more instances, an architecture having a parsing engine dynamically renders web forms given a specification document. The document may include an extension of a JSON schema. In some instances the architecture may leverage the specification document and enable creation, management, and eventual decommissioning actions. The architecture may be framework-agnostic, allowing for adaptive and agile development of end user interfaces for services developed by different entities. The architecture may allow for real-time template updates out of regular release cycles. In an embodiment, a provider hosts the schema document and provides to a parsing engine the schema for a day one action.

Figure 1:
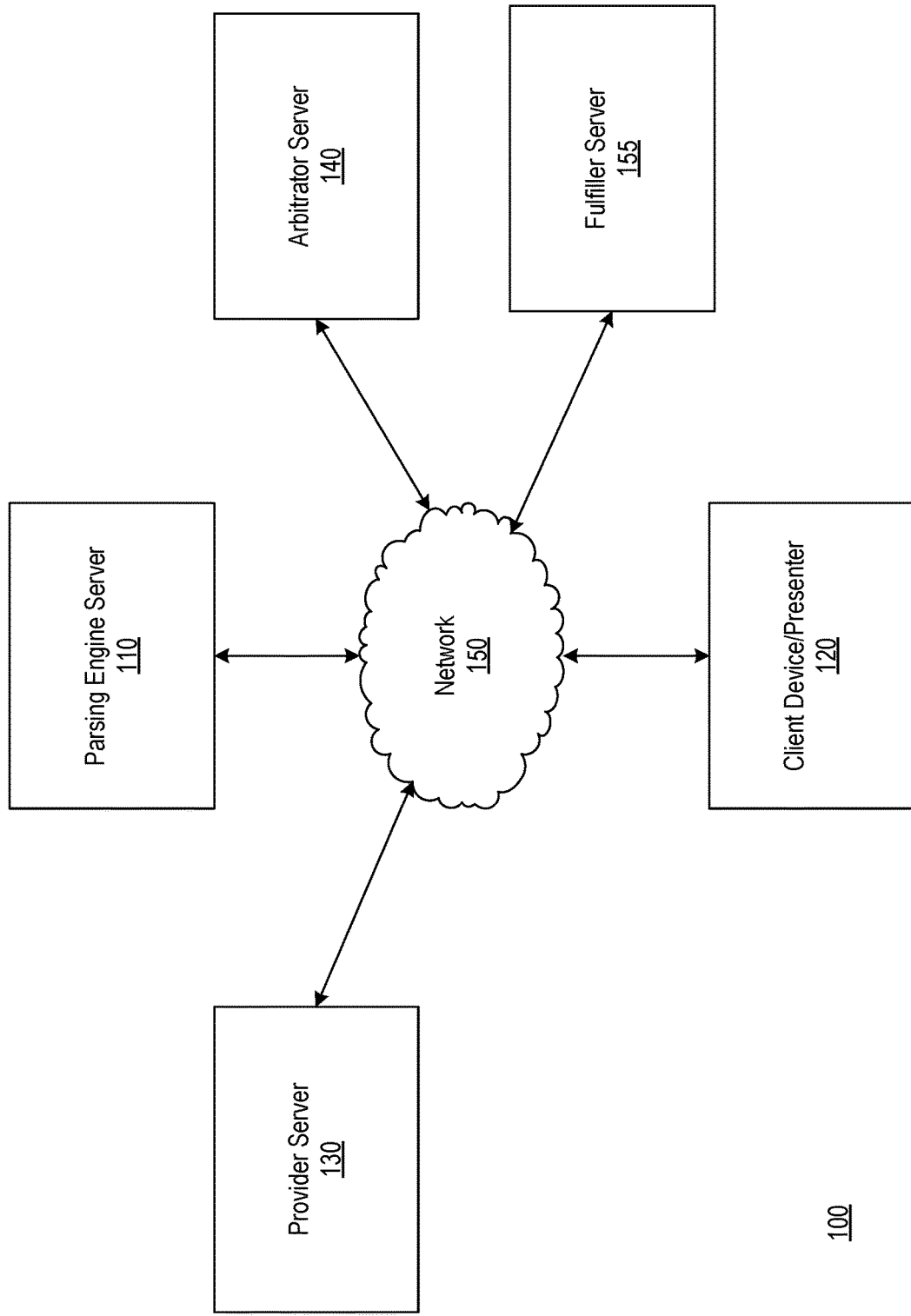
FIGS. 1 and 2 depict an illustrative computing environment for deploying an enhanced template based system for rendering web forms in accordance with one or more example embodiments.
Figure 2:
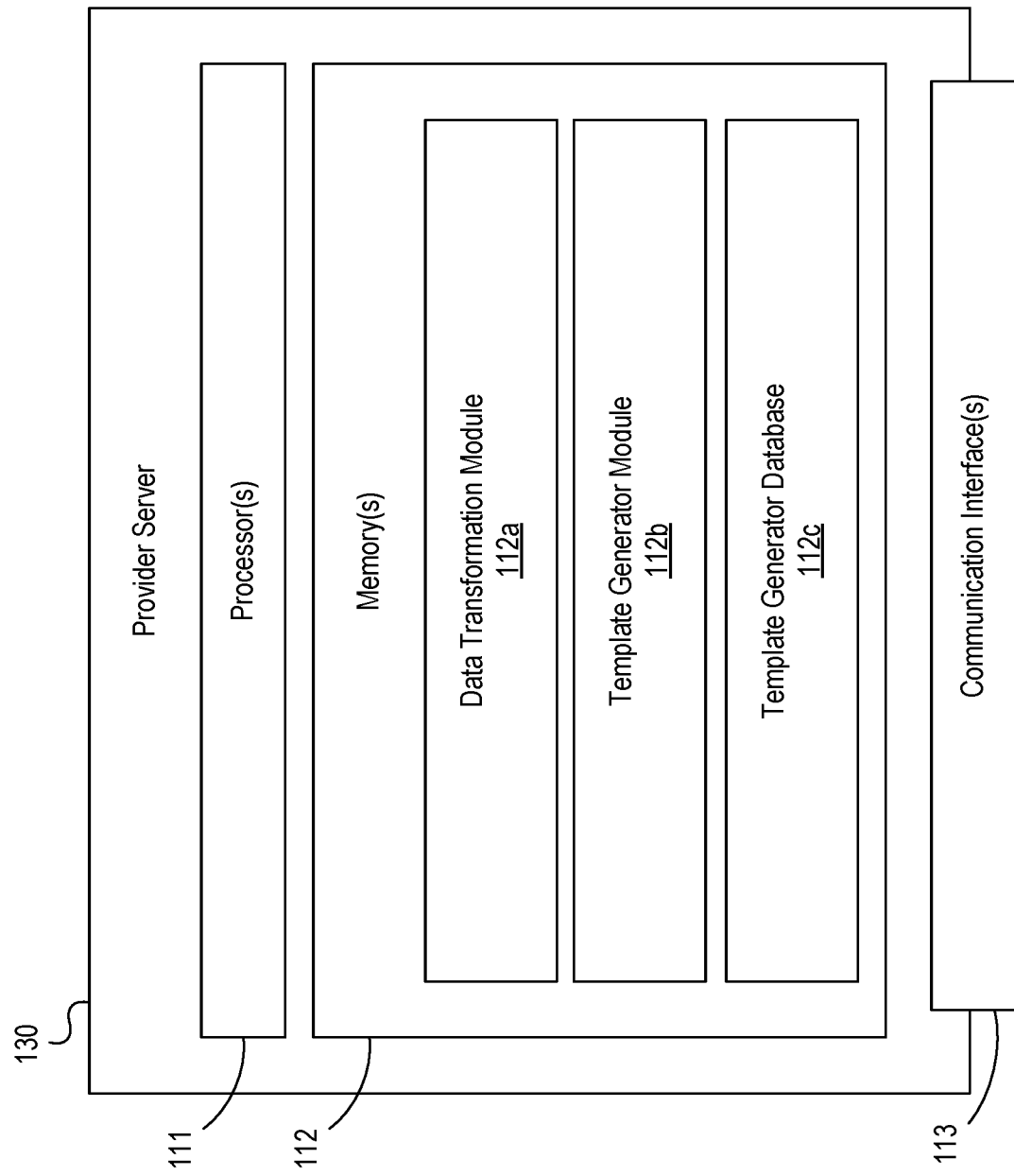

FIGS. 1 and 2 depict an illustrative computing environment for deploying a template driven interface system in accordance with one or more example embodiments. Referring to FIG. 1, template driven interface system 100 may include one or more computer servers and devices. For example, template driven interface system 100 may include a client device/presenter 120, a parsing engine server 110, a provider server 130, an arbitrator server 140, and a fulfiller server 155.

As illustrated in greater detail below, client device/presenter 120 may include one or more computing devices and/or other computer components (e.g., processors, memories, communication interfaces). Client device/presenter 120 may cause display of and/or otherwise present one or more graphical user interfaces (e.g., browser interfaces based on HTML pages received). In some instances, the client device 120 may be a desktop computer, a laptop computer, a tablet, a mobile device, or the like. In one or more instances, the client device/presenter 120 may be configured to receive one or more revised web forms. Additionally, the client device/presenter 120 may be configured to include a presenter role which may display web forms and submit requests. In an embodiment, the presenter may include a web browser.

In one or more instances, client device/presenter 120 may perform numerous roles according to various aspects of the disclosure. The roles may include listing products and rendering on a graphical user interface order forms, order form modals, read-only data modals, read-only tabular data modals, asset-entry lists, and action lists. The client device/presenter 120 may also receive data entry and submit order data.

Provider server 130 may be a computer system that includes one or more computing devices (e.g., servers, server blades, or the like) and/or other computer components (e.g., processors, memories, communication interfaces). In one or more instances, provider server may be configured to provide and store SPKs.

In one or more instances, provider server 130 may perform numerous roles according to various aspects of the disclosure. The roles may include listing asset endpoints, listing order endpoints, order submit endpoints, product listing endpoints, product by Id endpoints, and base URLs. In addition, the provider server 130 may also store, manage, and publish product schemas for assets under its control.

Parsing engine server 110 may be a computer system that includes one or more computing devices (e.g., servers, server blades, or the like) and/or other computer components (e.g., processors, memories, communication interfaces) that may be used to request a product list from an arbitrator.

In one or more instances, parsing engine server 110 may perform numerous roles according to various aspects of the disclosure. The roles may include parsing schemas and submitted proxy contracts, injecting default values, editing submitted orders, and converting asset data to entries.

Arbitrator server 140 may be a computer system that includes one or more computing devices (e.g., servers, server blades, or the like) and/or other computer components (e.g., processors, memories, communication interfaces) that may be used to manage active providers. In one or more instances, arbitrator server 140 may perform numerous roles according to various aspects of the disclosure. The roles may include determining providers by SPK, providing a URL registry, onboarding endpoints, and querying for asset items. In addition, arbitrator server 140 may onboard and decommission endpoints in accordance with various embodiments of the disclosure.

Fulfiller server 155 may be a computer system that includes one or more computing devices (e.g., servers, server blades, or the like) and/or other computer components (e.g., processors, memories, communication interfaces) that may be used to produce a given product. In some embodiments, the roles of the fulfiller server 155 may be combined with the roles of the provider server 130.

In one or more instances, fulfiller server 155 may perform numerous roles according to various aspects of the disclosure. The roles may include providing status of endpoints, managing asset groupings, decommissioning assets, storing primary asset data, and exposing asset management APIs.

Template driven interface system 100 also may include one or more networks, which may interconnect client device/presenter 120, provider server 130, parsing engine server 110, arbitrator server 140, and fulfiller server 155. For example, computing environment 100 may include a network 150 which may interconnect the above listed client device and servers.

In one or more arrangements, client device/presenter 120, provider server 130, parsing engine server 110, arbitrator server 140, and fulfiller server 155 may be any type of computing device capable of receiving a user interface, receiving input via the user interface, and communicating the received input to one or more other computing devices. For example, client device/presenter 120, provider server 130, parsing engine server 110, arbitrator server 140, and fulfiller server 155, and/or the other systems included in template driven interface 100 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device/presenter 120, provider server 130, parsing engine server 110, arbitrator server 140, and fulfiller server 155 may in some instances, be special-purpose computing devices configured to perform specific functions.

Referring to FIG. 2 provider server 130 may include one or more processors 111, memory 112, and communication interface 113. A data bus may interconnect processor 111, memory 112, and communication interface 113. Communication interface 113 may be a network interface configured to support communication between provider server 130 and one or more networks (e.g., network 150, or the like). Memory 112 may include one or more program modules having instructions that when executed by processor 111 cause provider server 130 to perform one or more functions described herein and/or one or more databases that may store and/or otherwise maintain information which may be used by such program modules and/or processor 111. In some instances, the one or more program modules and/or databases may be stored by and/or maintained in different memory units of provider server 130 and/or by different computing devices that may form and/or otherwise make up provider server 130. For example, memory 112 may have, host, store, and/or include a data transformation module 112a, a template generation module 112b, and a template generation database 112c. Template generation module 112b may have instructions that direct and/or cause provider server 130 to execute template generation techniques. Template generation database 112c may store information used by template generation module 112b and/or provider server 130 in executing efficient updates to stored schemas and/or in performing other functions. Additionally, client device/presenter 120, parsing engine server 110, arbitrator server 140, and fulfiller server 155 may also include similar hardware and software as discussed above in relation to provider server 130.

Figure 3:
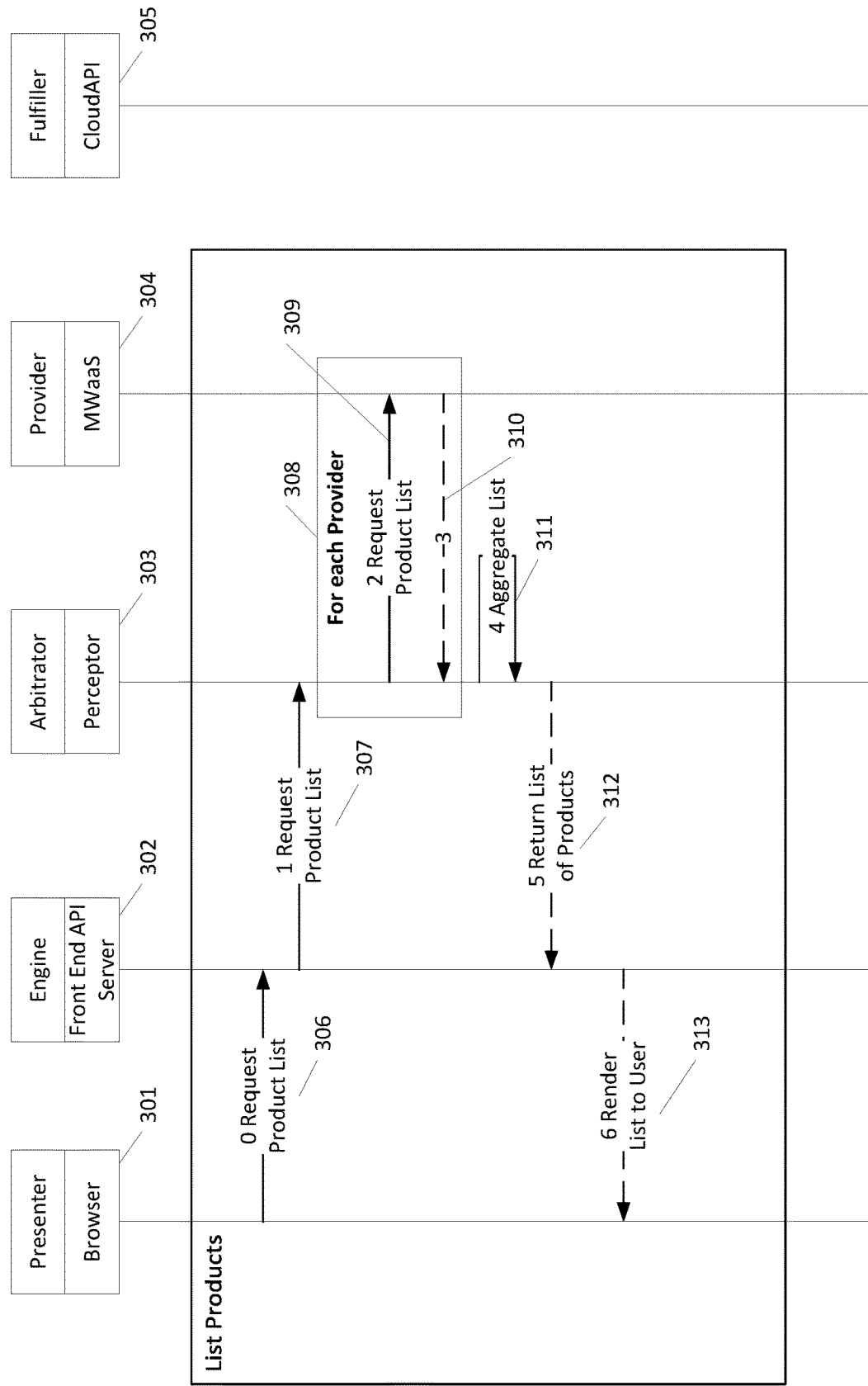
FIGS. 3-13 depict an illustrative event sequence diagrams for deploying an enhanced template based system for rendering web forms in accordance with one or more example embodiments.

FIGS. 3-6 depict illustrative event sequences for provisioning of a template driven interface system 100 in accordance with one or more exemplary embodiments. Referring to FIG. 3, at least five roles or services are illustrated for template driven interface system 100. For instance, presenter 301 may include a web browser. The presenter 301 may display web forms and transmit-submit requests to other services associated with template driven interface system 100. The presenter 301 may render on a user interface display a listing of products available to end users.

A parsing engine 302 may process a schema into a renderable web form format for use by presenter 301. In one or more instances, parsing engine 302 may receive form data and translate the received data into a format suitable for arbitrator 303. In an embodiment, parsing engine 302 transmits the formatted data to arbitrator 303.

Arbitrator 303 may direct traffic to the correct provider 304 in accordance with one or more exemplary embodiments. In an embodiment, arbitrator 303 may manage each provider 304. Arbitrator 303 may also provide security outside of template driven interface system 100 as some providers may be external entities.

In an aspect of the disclosure, each provider 304 may control the schema for each asset under management. In an embodiment, provider 304 may also control any submitted form-data orders.

A fulfiller 305 may produce a particular asset and is the primary holder of APIs that directly controls infrastructure, data, or other asset types. As shown in FIG. 3, fulfiller 305 may not have an active role in rendering a list of products requested by presenter 301.

FIG. 3 illustrates rendering a list of products in accordance with an embodiment of the disclosure. In FIG. 3 at step 306, presenter 301 may request from parsing engine 302 a list of products. At step 307, parsing engine 302 may request from arbitrator 303 the list of products. In an embodiment, arbitrator 303 may manage each provider 304 and maintain a list of all providers at step 308. The list of providers being managed by arbitrator 303 may also include a list of products for each provider as illustrated in step 310. In step 311, arbitrator 303 may aggregate the list and return the aggregated list to parsing engine 302 in step 312. The parsing engine 320 may execute some parsing before forwarding to presenter 302 so that it may be properly rendered. In step 313, the aggregated list may be rendered on a display for an end user by presenter 301.

Figure 4:
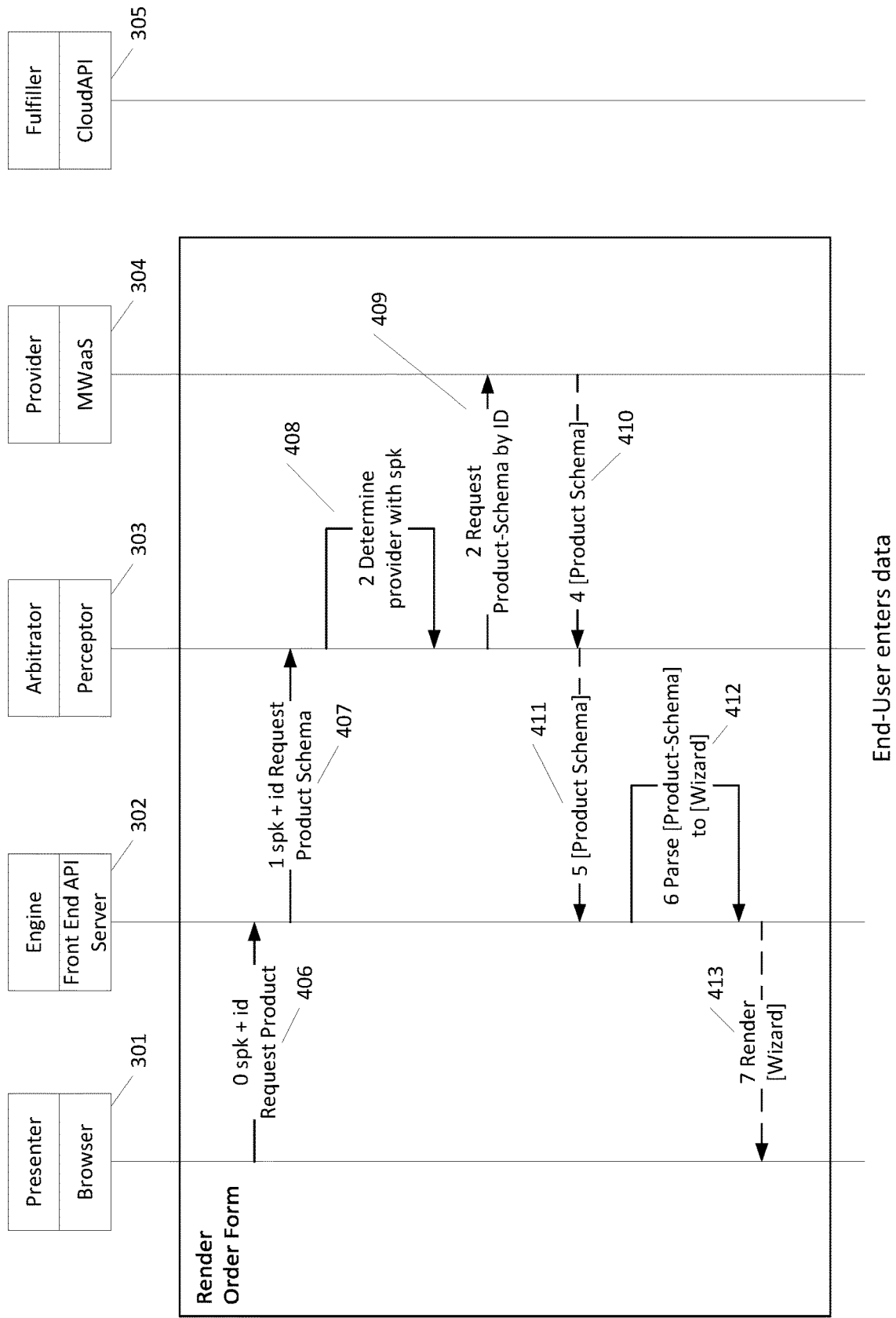

FIG. 4 illustrates rendering an order form in accordance with an embodiment of the disclosure. In FIG. 4 at step 406, presenter 301 may request from parsing engine 302 a product. In an embodiment, the request may include SPK and an identification ("id") for the requested product. In step 407, parsing engine 302 may forward the SPK along with an identification request to arbitrator 303. In an embodiment at step 408, arbitrator 303 may determine the provider based on the SPK. In step 409, arbitrator 303 may request the product schema by the identification. In an embodiment, provider 304 may transmit the product schema back to the arbitrator 303 in step 410. In step 411, the product schema may be transmitted from the arbitrator 303 to the parsing engine 302. In one or more instances, parsing engine 302 may parse the product schema into a format renderable by the wizard. In an embodiment, parsing engine 302 may parse the product schema into an array format for use by the rendering wizard. In addition, a key may be utilized as part of the rendering function for security. In step 413, presenter 301 may render the order form to an end user.

Figure 5:
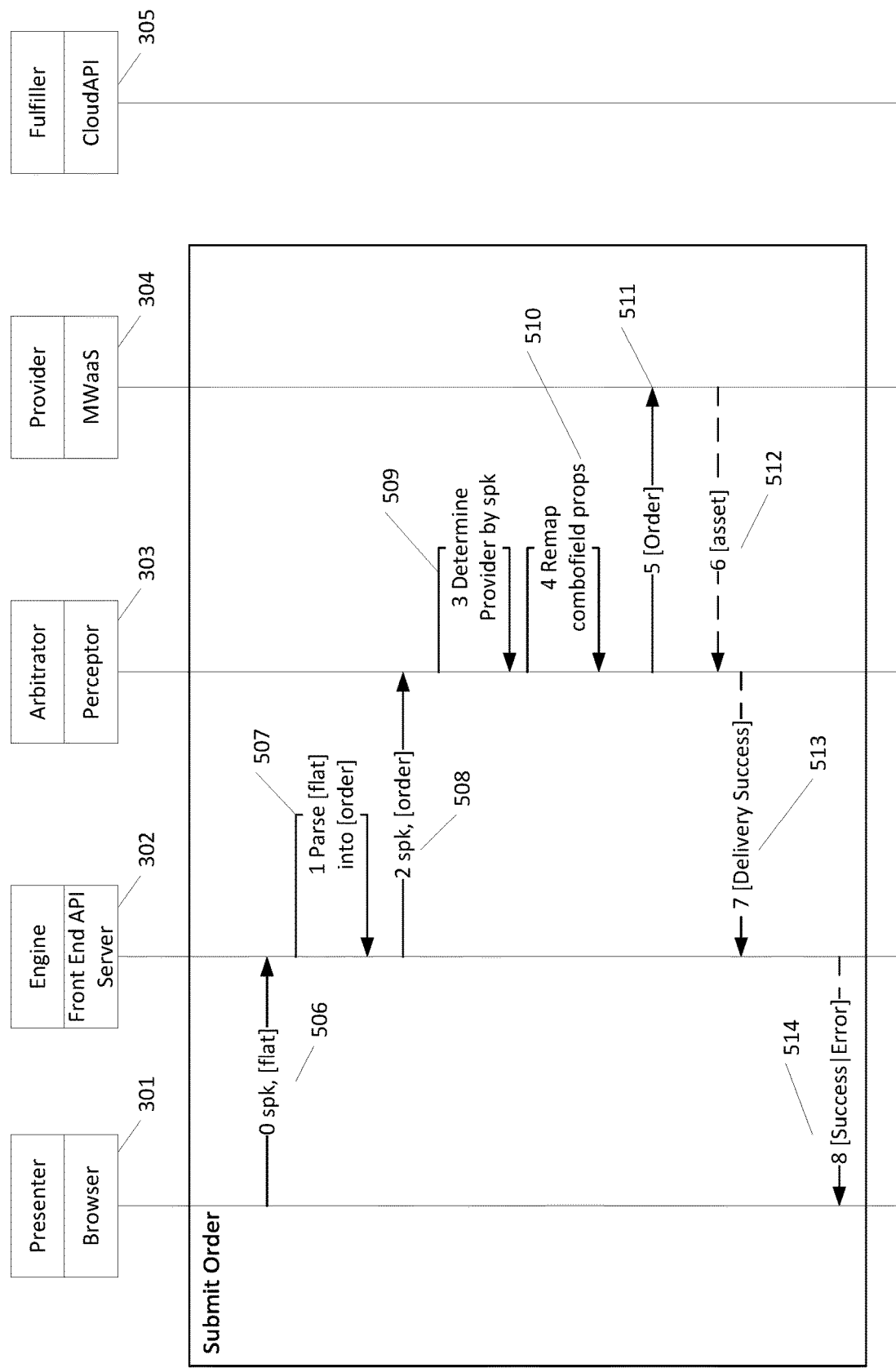
Figure 6:
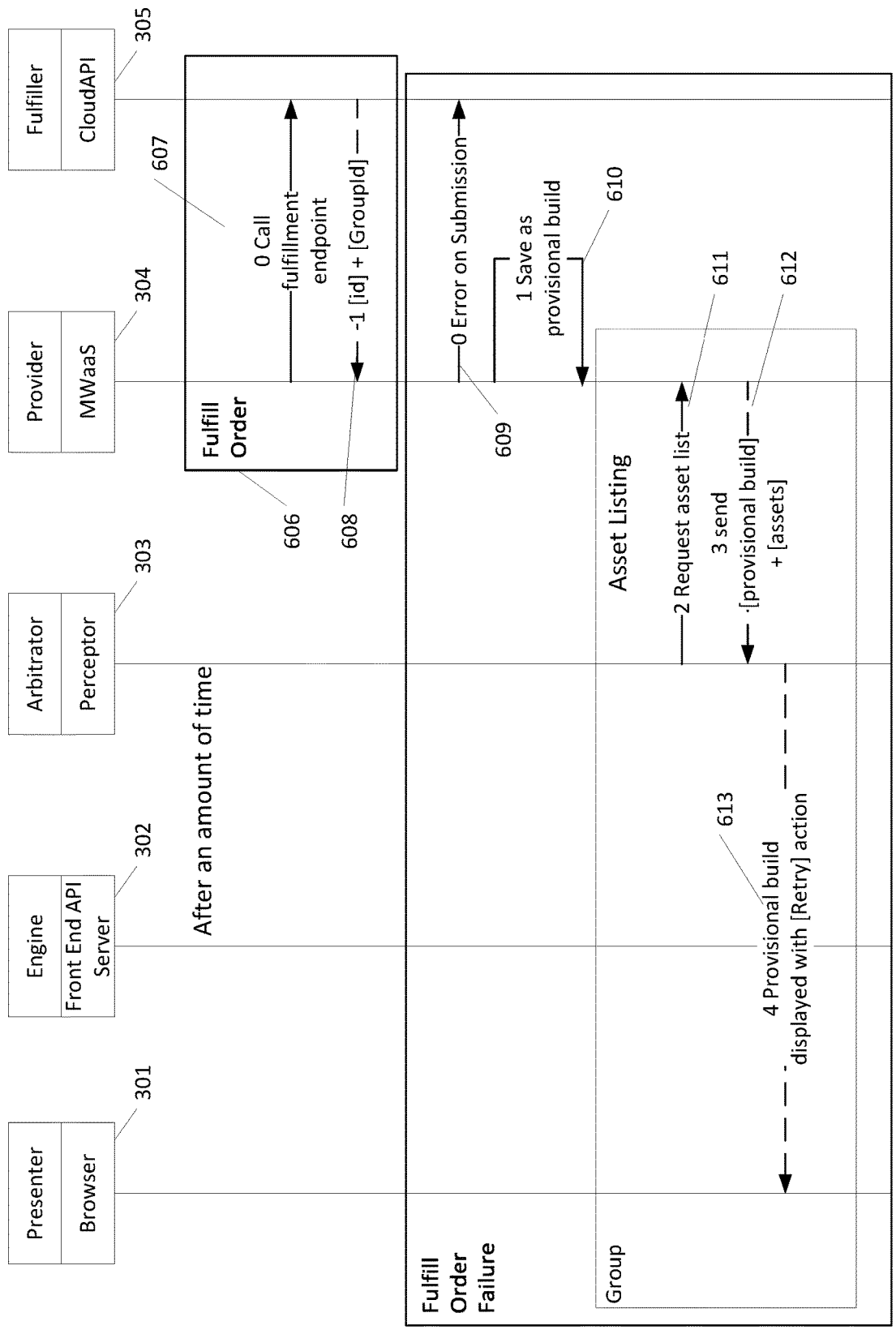

FIGS. 5 and 6 illustrate submitting an order in accordance with an embodiment of the disclosure. In FIG. 5, a user may enter data into presenter 301 for processing by template driven interface 100. In FIG. 5 at step 506, presenter 301 may request from parsing engine 302 a product. In an embodiment, presenter 301 may submit an order having an SPK and data (which may include metadata) to parsing engine 302. In one or more instances, parsing engine 302 at step 507 may parse and transform the received data in order to have the data conform to a format included in the specification. In an embodiment, flat data may be transformed into an order object. In step 508, the SPK and the order object may be transmitted to arbitrator 303. In step 509, arbitrator 303 may determine the provider based on the SPK. In addition, in step 510, the arbitrator 303 may do some remapping for particular providers, if required. In step 511, the order object is transmitted to the provider 304. The provider 304 may transmit the order object to the providers submit endpoint.

In an embodiment, provider 304 may determine if the order object received is a valid order object or an order object including an error. If provider 304 determines that the order object meets requirements, provider 304 may transmit to arbitrator 303 in step 512 the requirements for what the asset should look like which may include information such as an asset identification. In step 513, arbitrator 303 may deliver a successful delivery notification to parsing engine 302. In step 514, parsing engine 302 may provide presenter 301 with a successful delivery notification. In an embodiment, presenter 301 may notify a user of the successful submitted order. The notification may be visual or contain text as to status of the received order. If there was an error encountered as to the submitted order, presenter 301 may notify the user as to the problem with the potential order and provide recommended remedies.

In an embodiment, after an amount of time, provider 304 may attempt to fulfill the order 606 using fulfiller 305. In one instance, provider 304 and the fulfiller 305 may be the same entity. In step 607, a call to a fulfillment endpoint may be initiated by provider 304. After a successful fulfillment, an Id and groupId may be forwarded to provider 304 as shown in step 608. An order fulfillment failure 620 may be handled as shown in steps 609 through 613.

Figure 7:
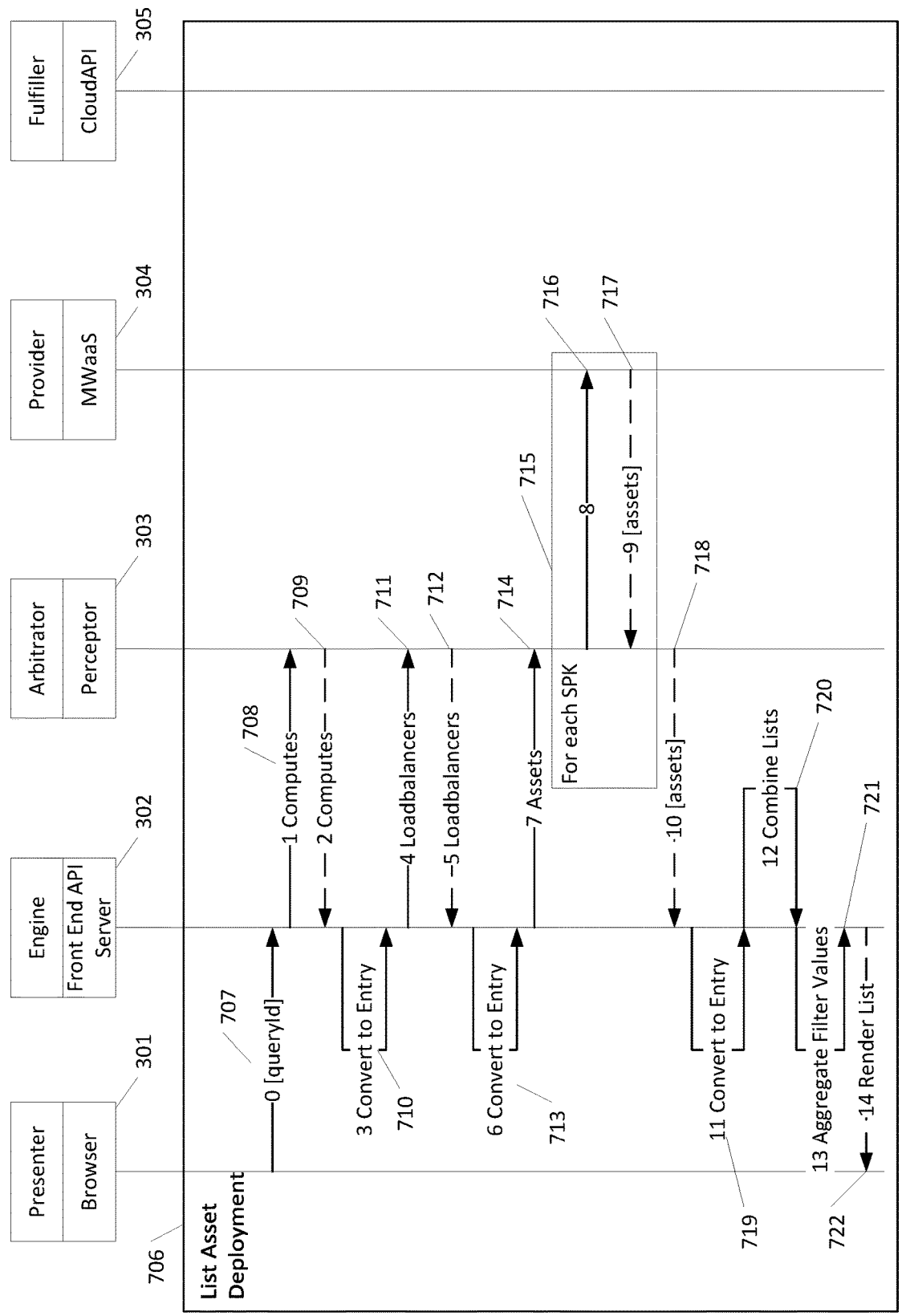

FIGS. 7-11 depict illustrative event sequences for post provisioning of a template driven interface system 100 in accordance with one or more exemplary embodiments. FIG. 7 illustrates rendering a list of deployed assets in accordance with an embodiment of the disclosure. In FIG. 7, at step 707, presenter 301 requests a list of deployed assets from parsing engine 302. In one instance, presenter 301 transmits to parsing engine 302 a location of where the user is in the interface. In an embodiment, presenter 301 which may be in a deployment may need a listing of all assets to determine the status of order fulfillment.

In an aspect of the disclosure, steps 708 through 712 regarding computes and load balancers are optional and may be needed in some system configurations between parsing engine 302 and arbitrator 303. In step 713, parsing engine 302 may covert the data to an entry. In step 714, arbitrator 303 may receive the request for assets from parsing engine 302. In an embodiment as shown in step 715, arbitrator 303 may step through each provider 304 by SPK asking if they have anything based on a particular context as shown in step 716. The identified assets may be transmitted to arbitrator 303 in step 717. In step 718, the identified assets may be transmitted to parsing engine 302. Parsing engine 302 may convert the assets to an entry in step 719. The lists may be combined by parsing engine 302 in step 720. An aggregate filter in step 721 may be applied by parsing engine 302 to the combined list. Finally, the filtered list may be rendered to the presenter 302 in step 722.

Figure 8:
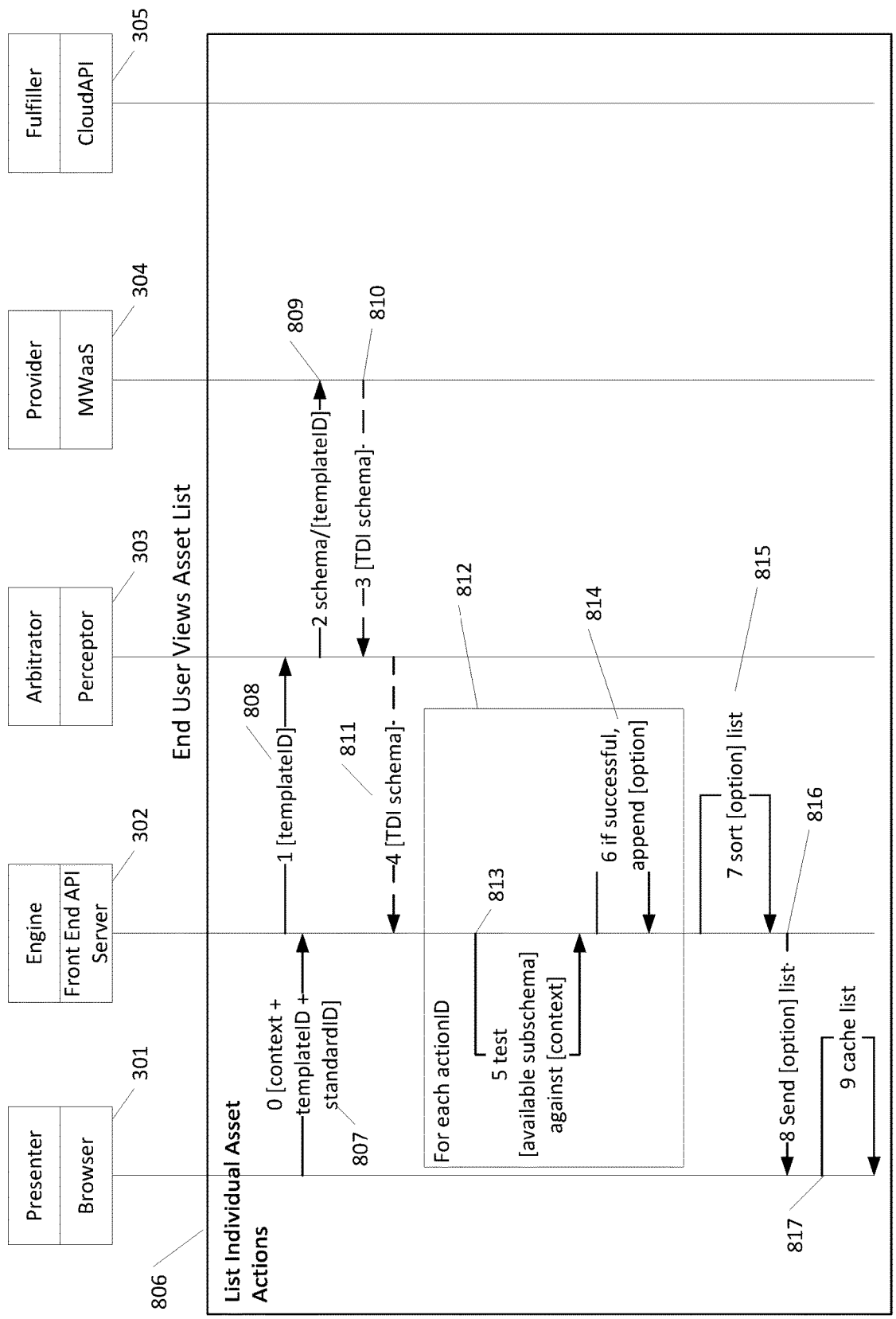

FIG. 8 illustrates rendering a list of individual asset actions in accordance with an embodiment of the disclosure. In FIG. 8, at step 807, presenter 301 may transmit a request with all data of the current object and also including pieces of context information to parsing engine 302. In one or more instances, the context information may include three pieces of data such as a template ID, a user ID or standard ID, and information regarding the context of where we are in the post provisioning process (development environment, deployment environment etc. . . . ). In an embodiment, these actions may be day two actions which are executed via the schema. The parsing engine 302 requests and receives the schema from arbitrator 303 and/or provider 304 via steps 808 to 811. Parsing engine 302 may receive the schema for day two actions and test the received schema for the options that may be available. In an embodiment, the testing may be performed via a sub-schema as shown at step 812. If testing is successful, the parsing engine 302 may append the list of options into an array at step 814. The parsing engine 302 may sort the list in step 815 and forward the list in step 816 to presenter 301. In an embodiment, presenter 301 may cache the list of received asset actions in step 817.

Figure 9:
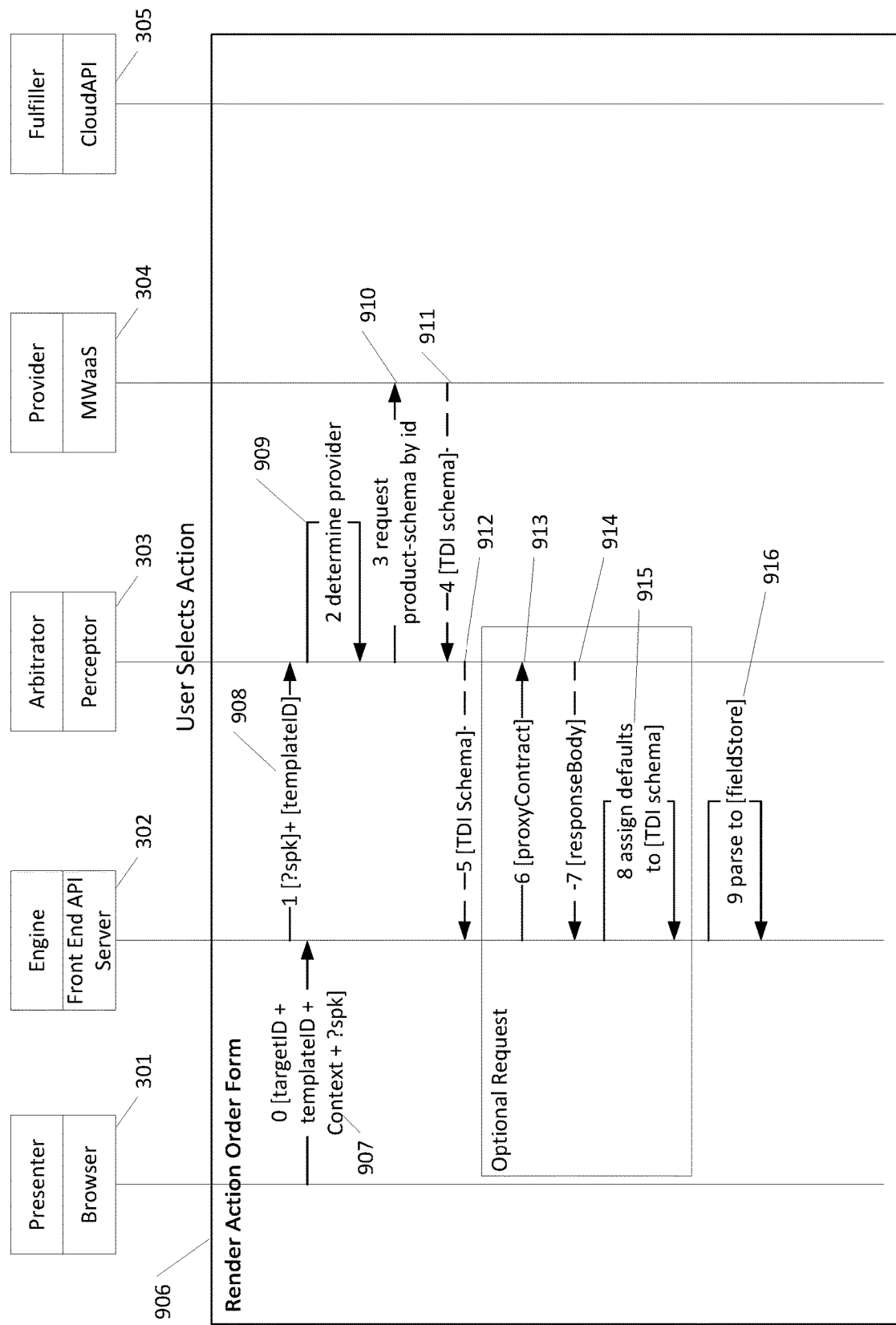
Figure 10:
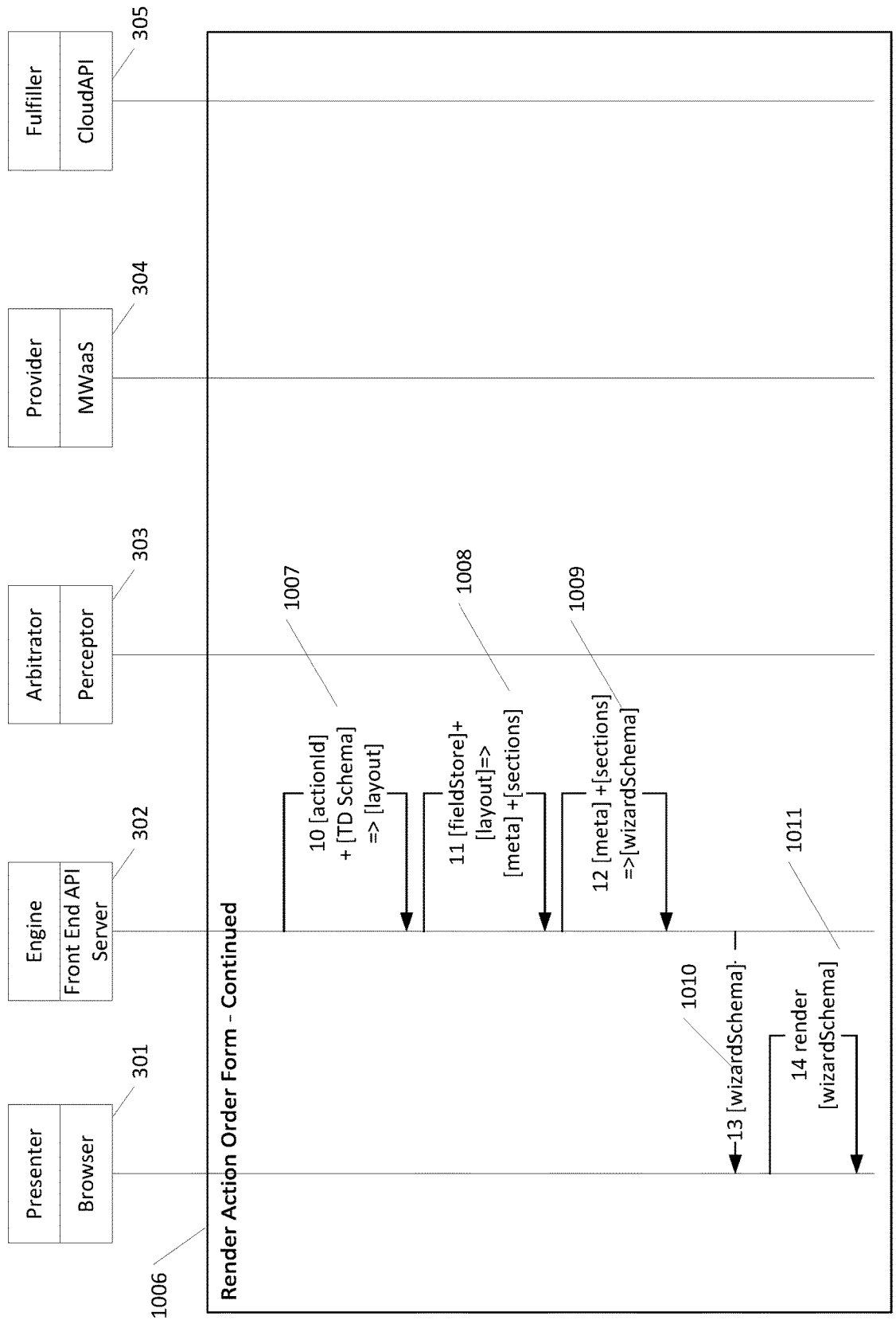

FIGS. 9 and 10 illustrate rendering an action order form in accordance with an embodiment of the disclosure. In FIG. 9 at step 907, presenter 301 may request from parsing engine 302 an action order form with data of the current object and pieces of context information. In an embodiment, the request may include a target ID, a template ID, a SPK, and information regarding the context of where product is in the post provisioning process (development environment, deployment environment etc. . . . ).

In step 908, parsing engine 302 may forward the request along with the SPK and template ID to arbitrator 303. In an embodiment at step 909, arbitrator 303 may determine the provider. Arbitrator 303 may in step 910 request the product schema by the template ID. In an embodiment, provider 304 may transmit the product schema back to the arbitrator 303 in step 911. In step 912, the product schema may be transmitted from the arbitrator 303 to the parsing engine 302.

In an embodiment, an optional request as shown in FIG. 9 may be handled by parsing engine 301 via steps 913 to 915. In one or more instances, parsing engine 302 may parse the product schema into different sections as shown in steps 916 and 1007-1009 of FIGS. 9 and 10. In an embodiment, parsing engine 302 may parse the product schema into an array format for use by the rendering wizard in step 1010. In addition, a key may be utilized as part of the rendering function for security. In step 1011, presenter 301 may render the order form.

Figure 11:
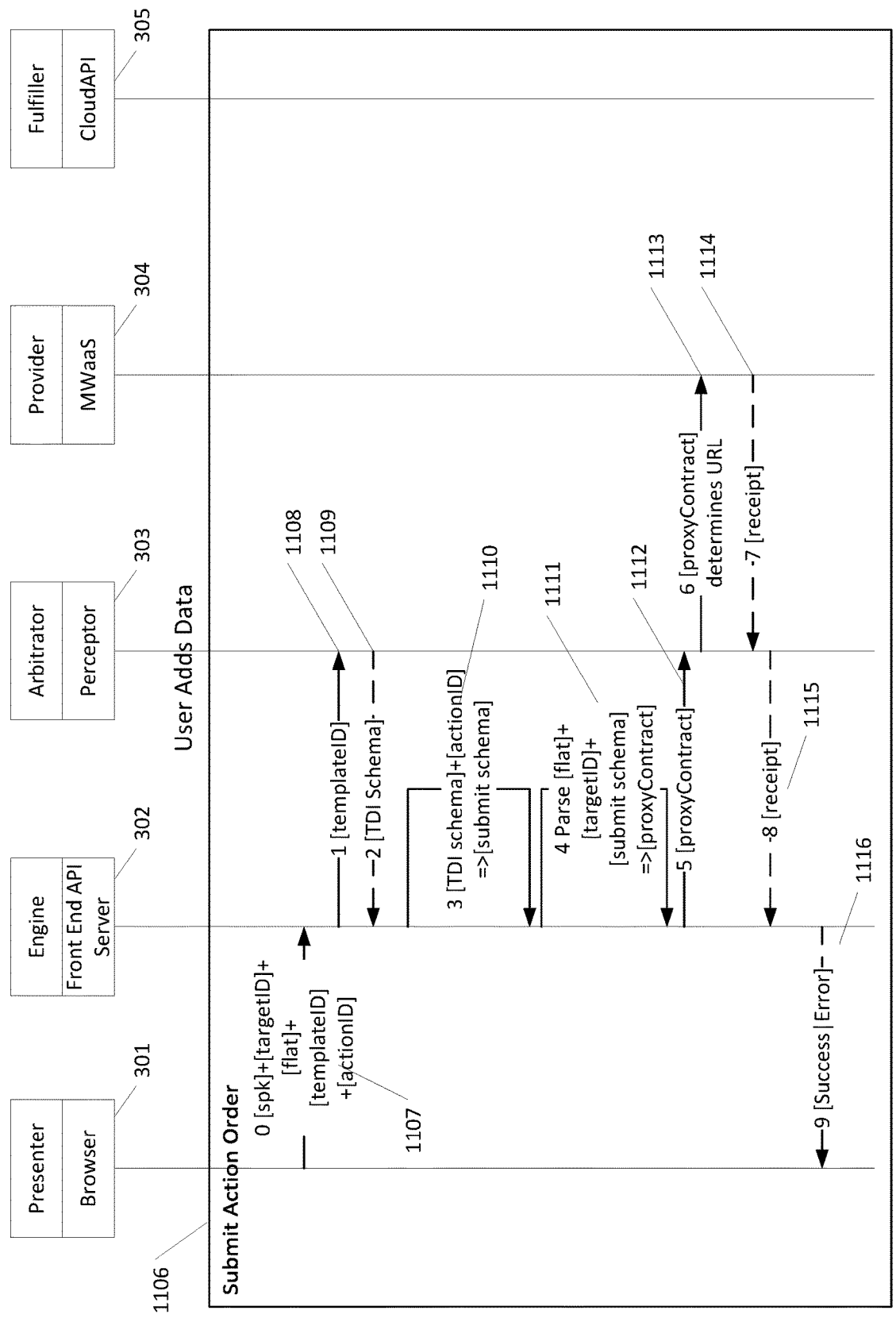

FIG. 11 illustrates submitting an action order in accordance with an embodiment of the disclosure. In FIG. 11, a user may enter data into presenter 301 for processing by template driven interface 100. In FIG. 11 at step 1107, presenter 301 may submit an action order having a target ID, template ID, action ID, a SPK, and data (which may include metadata) to parsing engine 302 in step 1107.

In one or more instances, the template ID is transmitted at step 1108 to arbitrator 303 by parsing engine 302. In an embodiment at step 1109, arbitrator 303 may provide the schema. In steps 1110-1111 parsing engine 302, may parse the data and construct a request to determine the URL of the provider. In step 1112, the request is submitted to arbitrator 303. In step 1113, arbitrator 303 may determine the provider URL. The provider 304 may return a receipt notification in step 1114 to arbitrator 303. In step 1115, arbitrator 303 may deliver a successful delivery receipt notification to parsing engine 302. In step 1116, parsing engine 302 may provide presenter 301 with a successful delivery notification. In an embodiment, presenter 301 may notify a user of the successful submitted action order. The notification may be visual or contain text as to status of the received order. If there was an error encountered as to the submitted action order, presenter 301 may notify the user as to the problem with the potential order and provide recommended remedies.

Figure 12:
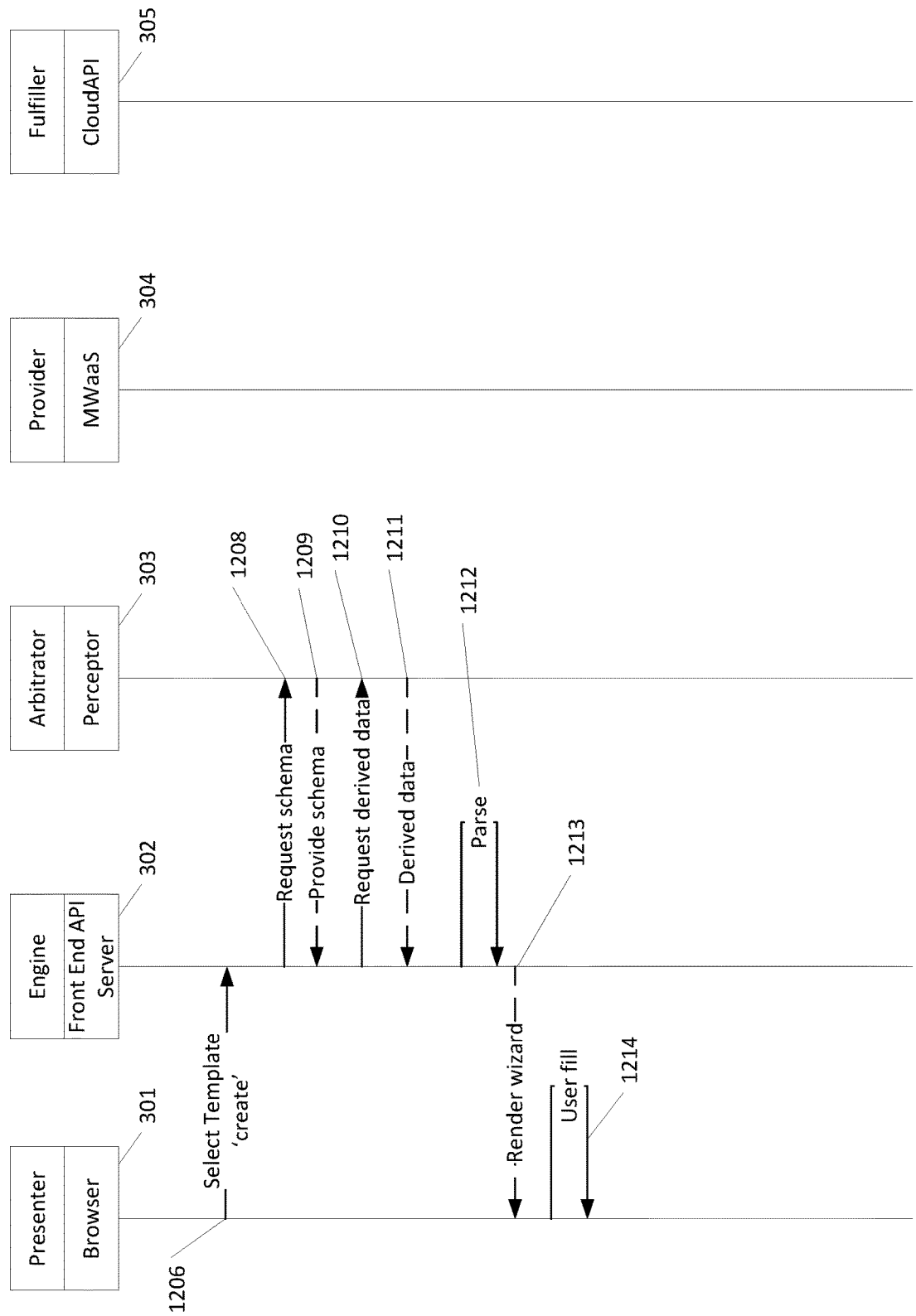
Figure 13:
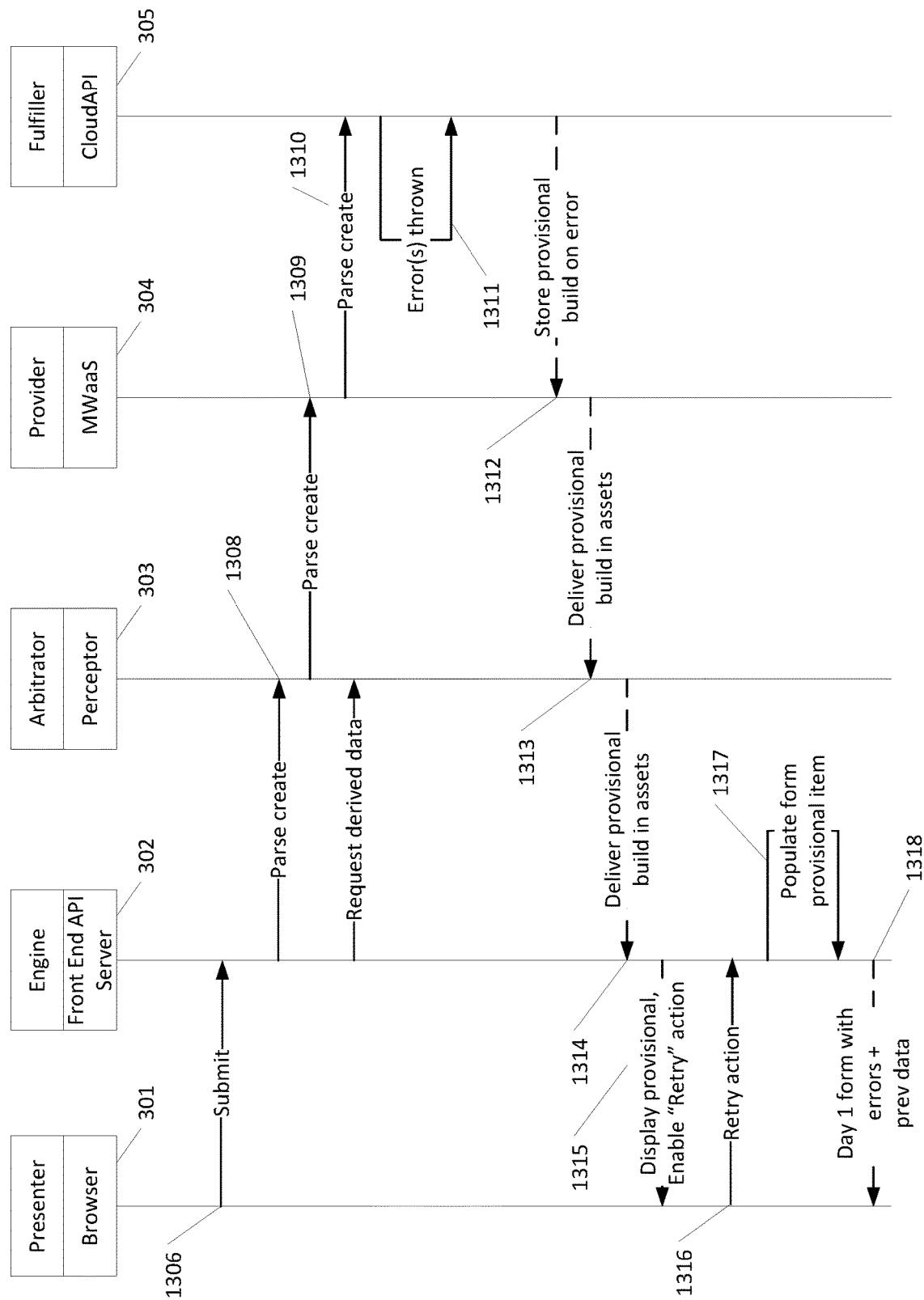

FIGS. 12 and 13 illustrate a build flow in accordance an embodiment of the disclosure. In particular, FIG. 12 illustrates using a template that is verified to be in compliance with a schema (steps 1206 to 1212) and rendering in step 1213 the template by the presenter 301. In step 1214, data is inputted into the template and forwarded to the fulfiller 305 for fulfillment in steps 1306 to 1311 of FIG. 13. In an embodiment, the generated provisional asset is received by presenter 301 via step 1312 to 1318.

Figure 14:
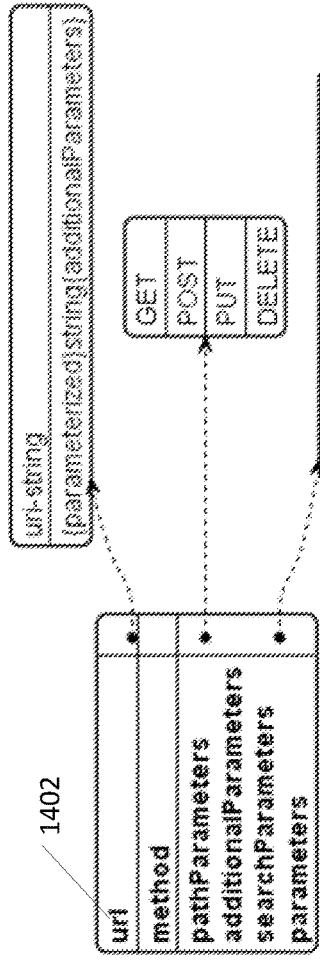
FIG. 14 depicts an illustrative request, path resolver, and an provider entity for deploying an enhanced template based system for rendering web forms in accordance with one or more example embodiments.
Figure 14:
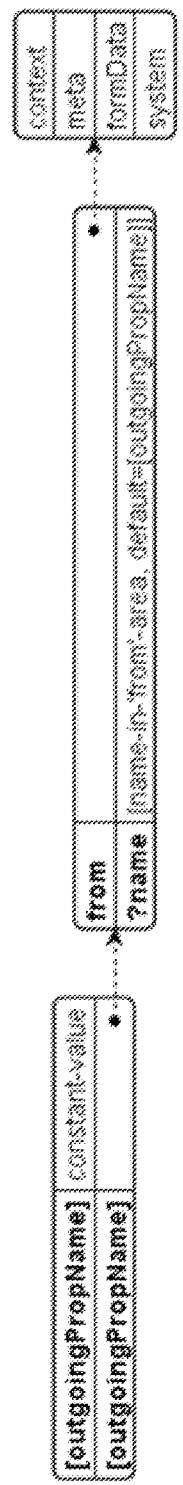
Figure 14:
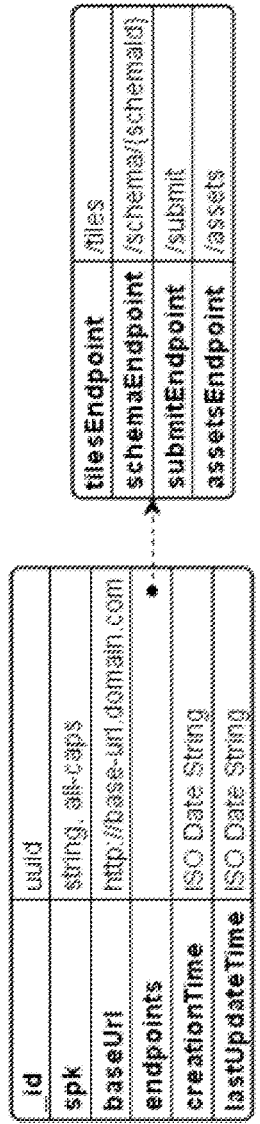

FIG. 14 depicts an illustrative request, path resolver, and a provider entity for deploying an enhanced template based system for rendering web forms in accordance with one or more example embodiments. For instance, FIG. 14 illustrates the structure of a request 1401 in an aspect of the disclosure. The request 1401 may include URL 1402 with may indicate the destination for the request. The request 1401 may be used for both requesting and submitting day two actions.

Figure 15:
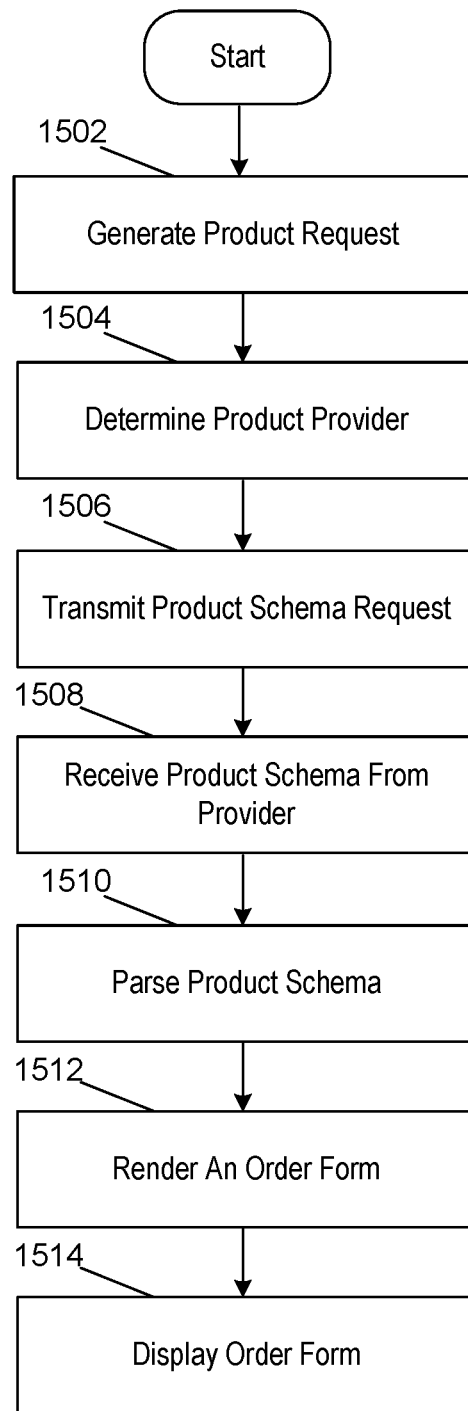
FIG. 15 depicts an illustrative method for deploying an enhanced template based system for rendering web forms in accordance with one or more example embodiments.

FIG. 15 depicts an illustrative method for deploying an enhanced template based system for rendering web forms in accordance with one or more example embodiments. Referring to FIG. 15, at step 1502, a computing device having at least one processor, a communication interface, and memory may generate a product request. In some instances, the product request may include an SPK and a product identification. At step 1504, the computing device may determine a product provider for handling the product request, the determination of the product provider based in part on searching for the product provider based on the included SPK in the product request. At step 1506, the computing device may transmit a product schema request to the determined product provide. At step 1508, the computing device may receive from the determined product provider the requested product schema. At step 1510, the computing device may parse the product schema into a renderable format. At step 1512, the computing device may render an order form for submitting an order. At step 1514, the computing device may display an order form.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device comprising:
    at least one processor;
    a communication interface communicatively coupled to the at least one processor; and
    memory storing computer-readable instructions that, when executed by the processor, cause the computing device to:
        generate a product request, the product request including a service provider key (SPK) and a product identification;
        determine a product provider for handling the product request, the determination of the product provider based in part on searching for the product provider based on the included SPK in the product request;
        transmit a product schema request to the determined product provider, the product schema comprising a JSON document;
        receive from the determined product provider the requested product schema;
        parse the product schema into a renderable format using a framework-agnostic parsing engine to enable real-time template updates outside regular release cycles for rendering web forms supporting day one and day two actions;
        render an order form for submitting an order based on the parsed product schema using a rendering wizard; and
        display the order form on a user interface.

2. The computing device of claim 1, wherein parsing the product schema comprises parsing the product schema into an array format for use by the rendering wizard.

3. The computing device of claim 2, wherein generating the product request comprises using a product request template stored in a template generation database to ensure compliance with the product schema.

4. The computing device of claim 3, wherein the memory stores additional computer-readable instructions that, when executed by the at least one processor, further cause the computing device to generate a key for use by the rendering wizard when rendering the order form to secure the rendering process for the day one and the day two actions.

5. The computing device of claim 4, wherein the memory stores additional computer-readable instructions that, when executed by the at least one processor, further cause the computing device to:
    receive order information from a user, the order information requesting an update to a webform; and
    generate an order, the order including the SPK of a product.

6. The computing device of claim 5, wherein the memory stores additional computer-readable instructions that, when executed by the at least one processor, further cause the computing device to:
    parse the order into a format in compliance with the product schema; and
    transmit the order to the determined product provider.

7. The computing device of claim 6, wherein the memory stores additional computer-readable instructions that, when executed by the at least one processor, further cause the computing device to receive a notification from the provider of a successful delivery of the order.

8. The computing device of claim 7, wherein the notification is a visual notification displayed on the user interface.

9. A method comprising:
    at a computing device comprising at least one processor, a communication interface, and memory:
        generating a product request, the product request including a service provider key (SPK) and a product identification;
        determining a product provider for handling the product request, the determination of the product provider based in part on searching for the product provider based on the included SPK in the product request;
        transmitting a product schema request to the determined product provider, the product schema comprising a JSON document;
        receiving from the determined product provider the requested product schema;
        parsing the product schema into a renderable format using a framework-agnostic parsing engine to enable real-time template updates outside regular release cycles for rendering web forms supporting day one and day two actions;
        rendering an order form for submitting an order based on the parsed product schema using a rendering wizard; and
        display the order form on a user interface.

10. The method of claim 9, further comprising generating the product request with a product request template stored in a template generation database to ensure compliance with the product schema.

11. The method of claim 10, further comprising parsing the product schema into an array format for use by the rendering wizard.

12. The method of claim 11, further comprising generating a key for use by the rendering wizard when rendering the order form to secure the rendering process for day one and day two actions.

13. The method of claim 12, further comprising:
receiving order information from a user, the order information requesting an update to a webform; and
generating an order, the order including the SPK of a product.

14. The method of claim 13, further comprising:
parsing the order into a format in compliance with the product schema; and
transmitting the order to the determined product provider.

15. The method of claim 14, further comprising receiving a notification from the provider of a successful delivery of the order.

16. The method of claim 15, wherein the notification is a visual notification displayed on the user interface.

17. One or more non-transitory computer-readable media storing instructions that, when executed by a computing device comprising at least one processor, a communication interface, and memory, cause the computing device to:
generate a product request, the product request including a service provider key (SPK) and a product identification;
determine a product provider for handling the product request, the determination of the product provider based in part on searching for the product provider based on the included SPK in the product request;
transmit a product schema request to the determined product provider, the product schema comprising a JSON document;
receive from the determined product provider the requested product schema;
parse the product schema into a renderable format using a framework-agnostic parsing engine to enable real-time template updates outside regular release cycles for rendering web forms supporting day one and day two actions;
render an order form for submitting an order based on the parsed product schema using a rendering wizard; and
display the order form on a user interface.

18. The one or more non-transitory computer-readable media storing instructions of claim 17, further causing the computer device to:
receive order information from a user, the order information requesting an update to a webform; and
generate an order, the order including the SPK of a product.

19. The one or more non-transitory computer-readable media storing instructions of claim 18, further causing the computer device to:
parse the order into a format in compliance with the product schema; and
transmit the order to the determined product provider.

20. The one or more non-transitory computer-readable media storing instructions of claim 19, further causing the computer device to generate a key for use by the rendering wizard when rendering the order form.

* * * * *